United States Patent
Venkataramudu et al.

(10) Patent No.: US 12,504,978 B2
(45) Date of Patent: Dec. 23, 2025

(54) DATACENTER SECURE CONTROL MODULE (DC-SCM) COMPOSABLE BIOS SYSTEM

(71) Applicant: Dell Products L.P., Round Rock, TX (US)

(72) Inventors: Raghavendra Venkataramudu, Bangalore (IN); Vinod Parackal Saby, Bangalore (IN); Swapan Kumar Bhakat, Jaduguda (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/490,170

(22) Filed: Oct. 19, 2023

(65) Prior Publication Data

US 2025/0130813 A1    Apr. 24, 2025

(51) Int. Cl.
*G06F 9/44*    (2018.01)
*G06F 9/4401*    (2018.01)

(52) U.S. Cl.
CPC ................... *G06F 9/4403* (2013.01)

(58) Field of Classification Search
CPC .................................................. G06F 9/4403
See application file for complete search history.

(56) References Cited

U.S. PATENT DOCUMENTS

| | | | |
|---|---|---|---|
| 11,221,858 B1 * | 1/2022 | Hormuth | G06F 9/4416 |
| 2007/0255936 A1 * | 11/2007 | Stemen | G06F 9/4411 713/2 |
| 2020/0301719 A1 * | 9/2020 | Castillo | G06F 9/4411 |

* cited by examiner

*Primary Examiner* — Jaweed A Abbaszadeh
*Assistant Examiner* — Ayman Fatima
(74) *Attorney, Agent, or Firm* — Joseph Mencher

(57) ABSTRACT

A DC-SCM composable BIOS system includes a DC-MHS computing device having a DC-SCM device with a BIOS subsystem and a BIOS configuration database. During initialization operations for the DC-SCM device that are part of an initialization of the DC-MHS computing device, the DC-SCM device determines that the DC-SCM device requires a BIOS image to be composed in order to operate with the DC-MHS computing device, and identifies a DC-MHS computing device processing system configuration and a DC-MHS computing device hardware configuration of the DC-MHS computing device. The DC-SCM device then retrieves BIOS modules from the BIOS configuration database based on the DC-MHS computing device processing system configuration and the DC-MHS computing device hardware configuration of the DC-MHS computing device, and uses them to compose the BIOS image. The DC-SCM device then provides the BIOS image in the BIOS subsystem, and causes a second initialization of the DC-MHS computing device.

20 Claims, 9 Drawing Sheets

DATACENTER SECURE CONTROL MODULE (DC-SCM) COMPOSABLE BIOS SYSTEM

BACKGROUND

The present disclosure relates generally to information handling systems, and more particularly to composing a Basic Input/Output System (BIOS) for a DataCenter Secure Control Module (DC-SCM) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and other computing devices known in the art may be provided in configurations promulgated by the Open Compute Project (OCP) according to the DataCenter Modular Hardware System (DC-MHS) sub-project (referred to as "DC-MHS" configurations below). As will be appreciated by one of skill in the art in possession of the present disclosure, the DC-MHS sub-project attempts to standardize a collection of Host Processor Module (HPM) form-factors and corresponding components (e.g., Add-In Cards (AICs)) to allow interoperability of those HPMs with computing devices and other platforms. Such DC-MHS configurations include a DataCenter Secure Control Module (DC-SCM) that performs conventional Basic Input/Output System (BIOS) functionality to provide initialization and runtime functionality for the DC-MHS computing device via the DC-SCM rather than via a conventional BIOS included on a conventional motherboard. However, the provisioning of the BIOS for DC-MHS computing devices via a DC-SCM can raise issues.

For example, one of the benefits of DC-MHS configurations is the ability to move the modular components between different DC-MHS computing devices, and thus the DC-SCM discussed above may be utilized with different DC-MHS computing devices during its lifetime. However, BIOS firmware images used to provide the BIOS functionality in the DC-SCM must be relatively "tightly coupled" or otherwise configured for the DC-MHS computing device with which they will be used. As such, DC-MHS-computing-device-specific/platform-specific BIOS firmware images (e.g., BIOS releases, updates, etc.) must be developed and maintained for use by DC-SCMs with the DC-MHS computing devices with which they will be utilized, and must be manually retrieved and provided on those DC-SCMs when they are moved to a different DC-MHS computing device in order to update the BIOS in those DC-SCMs to allow it to operate with that DC-MHS computing device. As such, while the modular design of DC-SCMs enable their use with different DC-MHS computing devices, such use introduces relatively substantial costs with regards to the need to develop and maintain DC-MHS-computing-device-specific/platform-specific BIOS firmware images.

Accordingly, it would be desirable to provide a DC-SCM BIOS system that addresses the issues discussed above.

SUMMARY

According to one embodiment, an Information Handling System (IHS) includes a DataCenter Secure Control Module (DC-SCM) device, comprising: a DataCenter Secure Control Module (DC-SCM) processing system; and a DC-SCM memory system that is coupled to the DC-SCM processing system and that includes instructions that, when executed by the DC-SCM processing system, cause the DC-SCM processing system to provide a DC-SCM Basic Input/Output System (BIOS) composing engine that is configured to: determine, during initialization operations for the DC-SCM device that are part of a first initialization of a DataCenter Modular Hardware System (DC-MHS) computing device in which the DC-SCM device is located, that the DC-SCM device requires a BIOS image to be composed in order to operate with the DC-MHS computing device; identify a DC-MHS computing device processing system configuration and a DC-MHS computing device hardware configuration of the DC-MHS computing device; retrieve, from a BIOS configuration database that is coupled to the DC-SCM processing system based at least partly on the DC-MHS computing device processing system configuration and the DC-MHS computing device hardware configuration of the DC-MHS computing device, a plurality of BIOS modules; compose, using the plurality of BIOS modules, the BIOS image; provide the BIOS image in a BIOS subsystem that is coupled to the DC-SCM processing system; and cause a second initialization of the DC-MHS computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
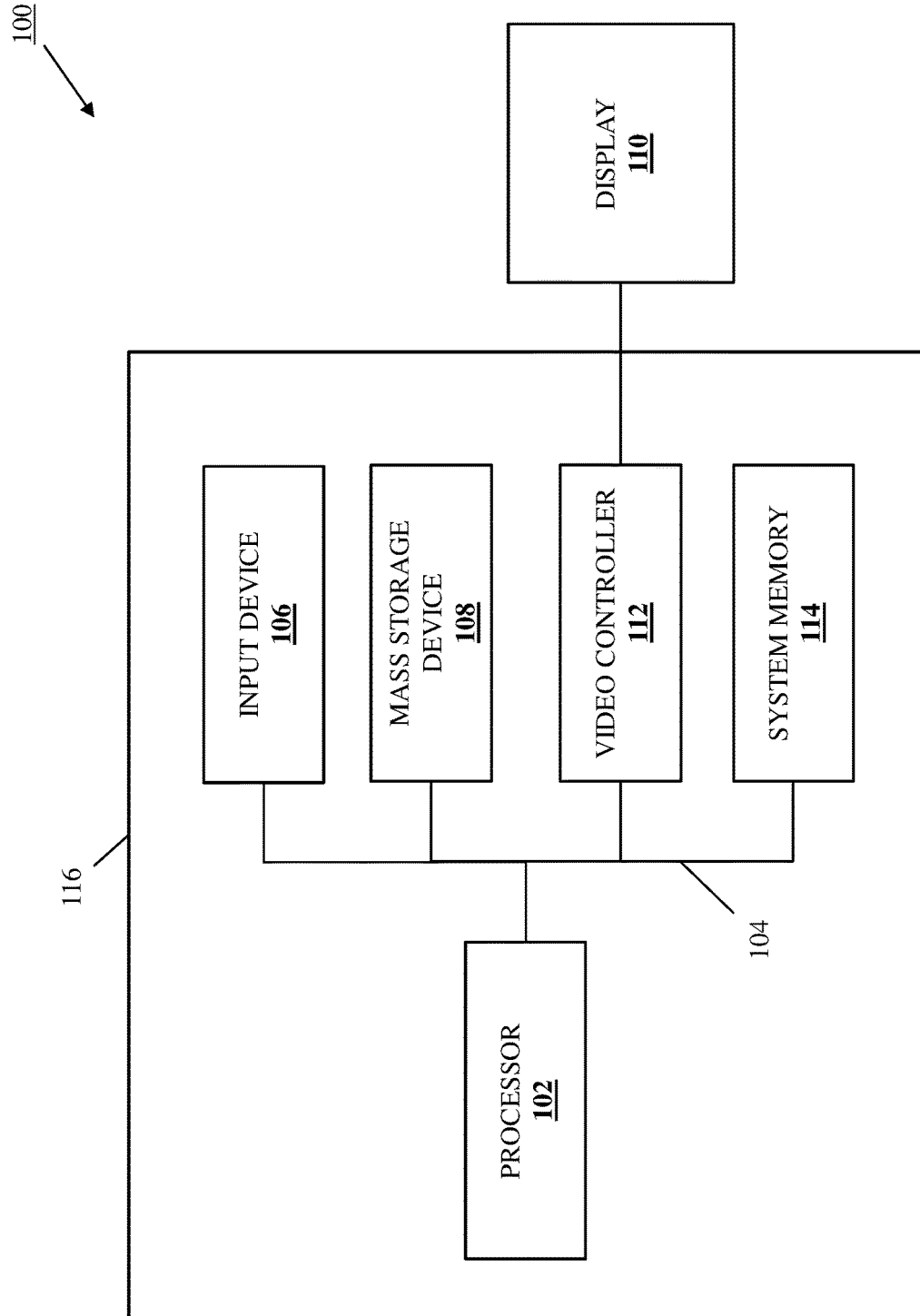
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
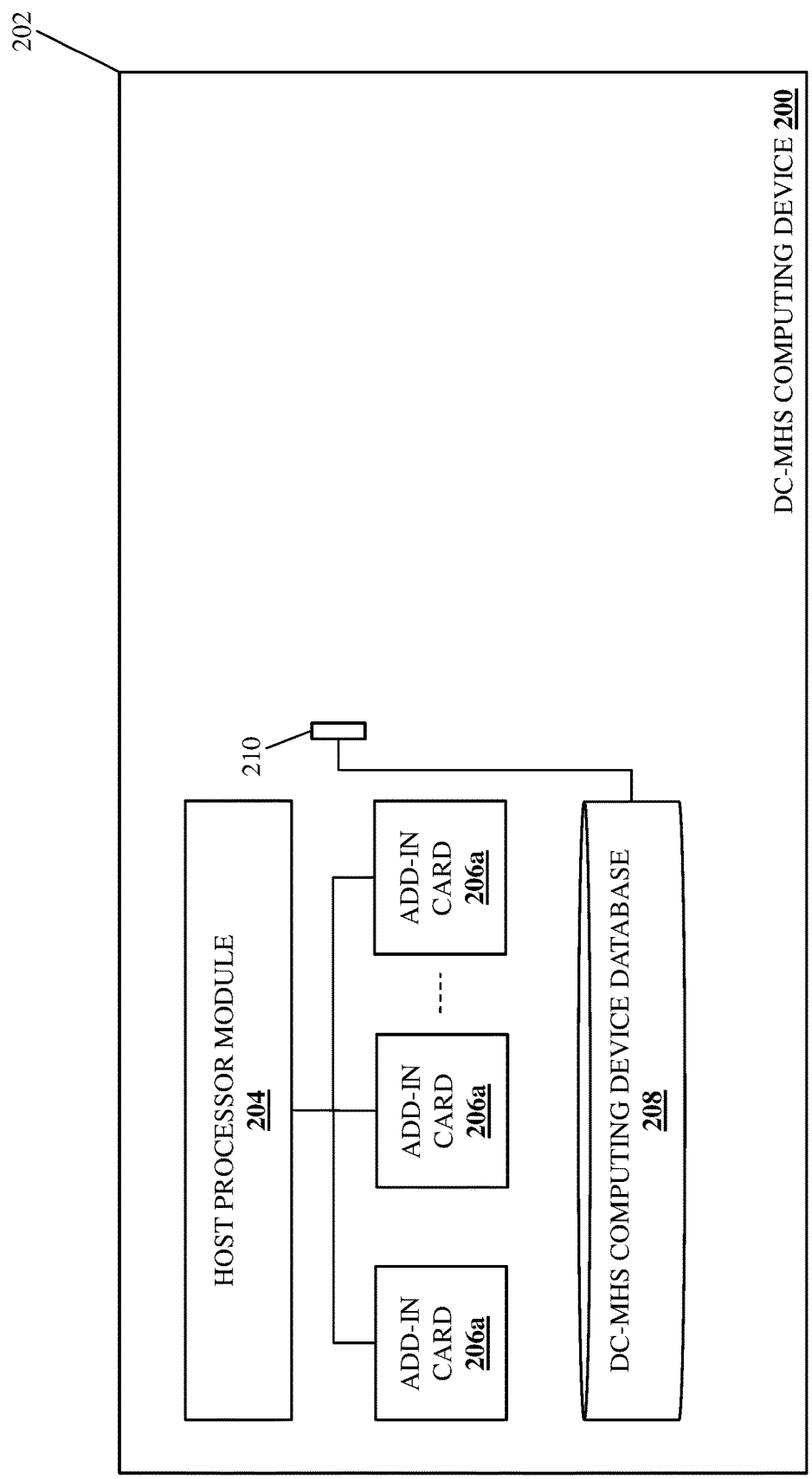
FIG. 2 is a schematic view illustrating an embodiment of a DC-MHS computing device that may provide the DC-SCM composable BIOS system of the present disclosure.

Referring now to FIG. 2, an embodiment of a DataCenter Modular Hardware System (DC-MHS) computing device 200 is illustrated that may provide the DC-SCM composable BIOS system of the present disclosure. In an embodiment, the DC-MHS computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the DC-MHS computing device 200 discussed below may be provided by other devices that are configured to operate similarly as the DC-MHS computing device 200 discussed below.

In the illustrated embodiment, the DC-MHS computing device 200 includes a chassis 202 that houses the components of the DC-MHS computing device 200, only some of which are illustrated and discussed below. For example, the chassis 202 may house a Host Processing Module (HPM) 204 that one of skill in the art in possession of the present disclosure will appreciate may be provided by a standardized processing component that provides a modular building block of the DC-MHS configurations described above. In a specific example, the HPM 204 may include a HPM form-factor and HPM subsystems that are standardized according to the DC-MHS Revision 1 (R1) to provide interoperability of the HPM 204 with the DC-MHS computing device 400, although other HPMs are envisioned as falling within the scope of the present disclosure as well.

Furthermore, the chassis 202 may also house a plurality of Add-In Cards (AICs) 206a, 206b, and up to 206c, each of which may be coupled to the HPM 204, and each of which may be provided by standardized components that one of skill in the art in possession of the present disclosure will recognize provide modular building blocks of the DC-MHS configurations discussed above. For example, each of the AICs 206a-206c may provide a DC-MHS module that may be provided in the DC-MHS computing device 200 and coupled to the HPM 204 in order to provide the DC-MHS computing device 200 functionality enabled by that AIC. To provide some specific examples, the AICs 206a-206c may be configured to provide graphics processing functionality, accelerator functionality, cryptography functionality, and/or any other functionality that would be apparent to one of skill in the art in possession of the present disclosure.

The chassis 202 may also house a storage system (not illustrated, but which may be similar to the storage 108 discussed above with reference to FIG. 1 and may be provided by a enhance Serial Peripheral Interface (eSPI) flash storage device and/or other storage systems known in the art) that includes a DC-MHS computing device database 208 that is configured to store a DC-MHS computing device processing system configuration of the DC-MHS computing device 200 (e.g., details of a chipset configuration provided by the HPM 204 such as, for example, details for a chipset provided by INTEL® Corp. of Santa Clara, California, United States; details for a chipset provided by AMD® Corp. of Santa Clara, California, United States; and/or other chipset configuration information that would be apparent to one of skill in the art in possession of the present disclosure), a DC-MHS computing device hardware configuration of the DC-MHS computing device 200 (e.g., details about platform risers, backplanes, internal storage, and/or other hardware details that would be apparent to one of skill in the art in possession of the present disclosure), and/or any other information about the DC-MHS computing device 200 that one of skill in the art in possession of the present disclosure would recognize as being required to compose the BIOS image and provide the BIOS functionality described below.

In the illustrated embodiment, the storage system that includes the DC-MHS computing device database 208 is coupled to a DC-SCM device connector 210 that is configured to connect to a DC-SCM device as described below, and thus may be provided by any of a variety of DC-MHS connectors that would be apparent to one of skill in the art in possession of the present disclosure. However, while a specific DC-MHS computing device 200 has been illustrated and described, one of skill in the art in possession of the present disclosure will recognize that DC-MHS computing devices (or other devices operating according to the teachings of the present disclosure in a manner similar to that described below for the DC-MHS computing device 200) may include a variety of components and/or component configurations for providing conventional DC-MHS computing device functionality, as well as the DC-SCM composable BIOS functionality discussed below, while remaining within the scope of the present disclosure as well.

Figure 3:
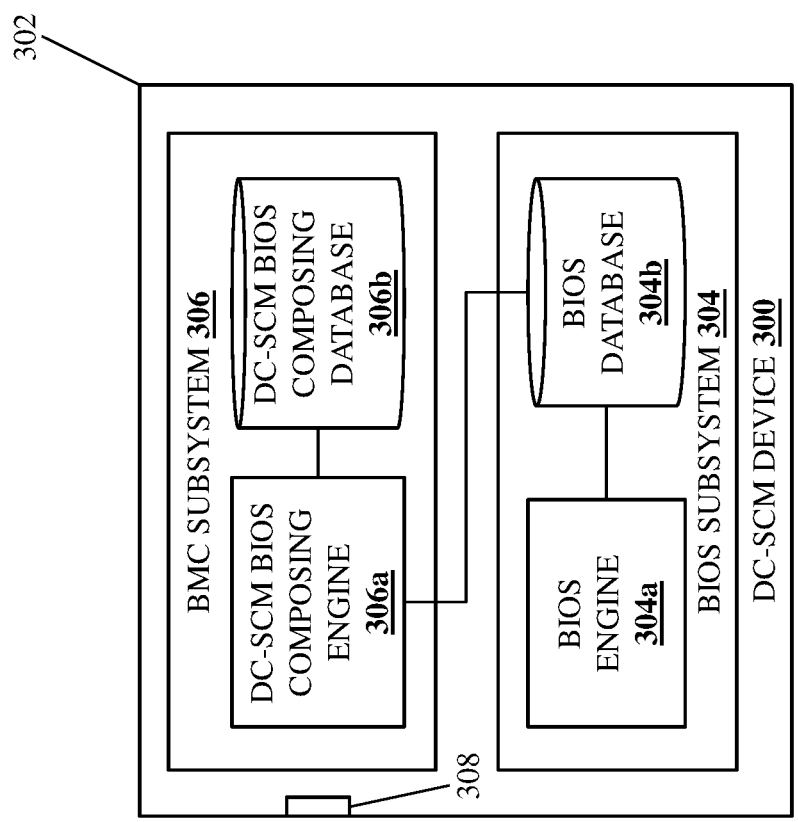
FIG. 3 is a schematic view illustrating an embodiment of a DC-SCM device that may provide the DC-SCM composable BIOS system of the present disclosure.

Referring now to FIG. 3, an embodiment of a DC-SCM device 300 is illustrated that may provide the DC-SCM composable BIOS system of the present disclosure, and thus may be provided in DC-MHS computing devices like the DC-MHS computing device 200 discussed above with reference to FIG. 2. In an embodiment, the DC-SCM device 300 may be provided by the IHS 100 discussed above with reference to FIG. 1 and/or may include some or all of the components of the IHS 100. As discussed above, the DC-SCM device 300 may be provided in computing devices with DC-MHS configurations in order to perform BIOS functionality to provide initialization and runtime operations for the DC-MHS computing device, to perform BMC functionality to management, security and control operations for the DC-MHS computing device, and/or other perform other DC-SCM functionality via the DC-SCM device rather than via a conventional BIOS and BMC device included on a conventional motherboard.

In the illustrated embodiment, the DC-SCM device 300 includes a chassis 302 (e.g., a circuit board) that supports the components of the DC-SCM device 300, only some of which are illustrated and described below. In the illustrated embodiment, the chassis 302 supports a BIOS subsystem 304 that one of skill in the art in possession of the present disclosure will appreciate may be configured to perform any of a variety of BIOS initialization and/or runtime operations for a DC-MHS computing device. Furthermore, while illustrated and described as providing a "BIOS", one of skill in the art in possession of the present disclosure will appreciate how the BIOS subsystem 304 may be replaced by a Unified Extensible Firmware Interface (UEFI) subsystem that is configured according to the UEFI specification that defines an architecture of platform firmware used for initializing computing devices, as well as interface for interacting with an operating system provided on computing devices, while remaining within the scope of the present disclosure as well.

In some examples, the BIOS subsystem 304 may include a BIOS processing system (not illustrated, but which may be similar to the processor 102 discussed above with reference to FIG. 1 and may be provided in any of a variety of BIOS firmware that would be apparent to one of skill in the art in possession of the present disclosure) and a BIOS memory system (not illustrated, but which may be similar to the memory 114 discussed above with reference to FIG. 1 and may be provided in any of a variety of BIOS firmware that would be apparent to one of skill in the art in possession of the present disclosure) that is coupled to the BIOS processing system and that includes instructions that, when executed by the BIOS processing system, cause the BIOS processing system to provide a BIOS engine 304a that is configured to perform the functionality of the BIOS engines and/or BIOS subsystems discussed below. The BIOS subsystem 304 may also include a BIOS storage system (e.g., a BIOS Serial Peripheral Interface (SPI) flash storage device) that is coupled to the BIOS engine 304a (e.g., via a coupling between the BIOS storage system and the BIOS processing system) and that includes a BIOS database 304b that is configured to store any of the information utilized by the BIOS engine 304a as discussed below.

In the illustrated embodiment, the chassis 302 also supports a Baseboard Management Controller (BMC) subsystem 306 that one of skill in the art in possession of the present disclosure will appreciate may be configured to perform management, security, and control operations for DC-MHS computing devices, as well as any other BMC operations that would be apparent to one of skill in the art in possession of the present disclosure. In an embodiment, the BMC subsystem 306 may include a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a DC-SCM BIOS composing engine 306a that is configured to perform the functionality of the DC-SCM BIOS composing engines and/or DC-SCM BIOS composing subsystems discussed below. As can be seen, the DC-SCM BIOS composing engine 306a may be coupled to the BIOS database 304 (e.g., via a coupling between the BMC processing system and the BIOS storage system discussed above). The BMC subsystem 306 may also include a BMC storage system that is coupled to the BMC engine 306a (e.g., via a coupling between the BMC storage system and the BMC processing system) and that includes a DC-SCM BIOS composing database 306b that is configured to store any of the logically composable BIOS modules described below (and/or updates thereof), as well as any other information utilized by the DC-SCM BIOS composing engine 306a discussed below.

In the illustrated embodiment, the chassis 302 also supports a DC-MHS computing device connector 308 that is configured to connect to a DC-MHS computing device as described below, and thus may be provided by any of a variety of DC-MHS connectors that would be apparent to one of skill in the art in possession of the present disclosure. However, while a specific DC-SCM device 300 has been illustrated and described, one of skill in the art in possession of the present disclosure will recognize that DC-SCM devices (or other devices operating according to the teachings of the present disclosure in a manner similar to that described below for the DC-SCM device 300) may include a variety of components and/or component configurations for providing conventional DC-SCM device functionality, as well as the DC-SCM composable BIOS functionality discussed below, while remaining within the scope of the present disclosure as well.

Figure 4:
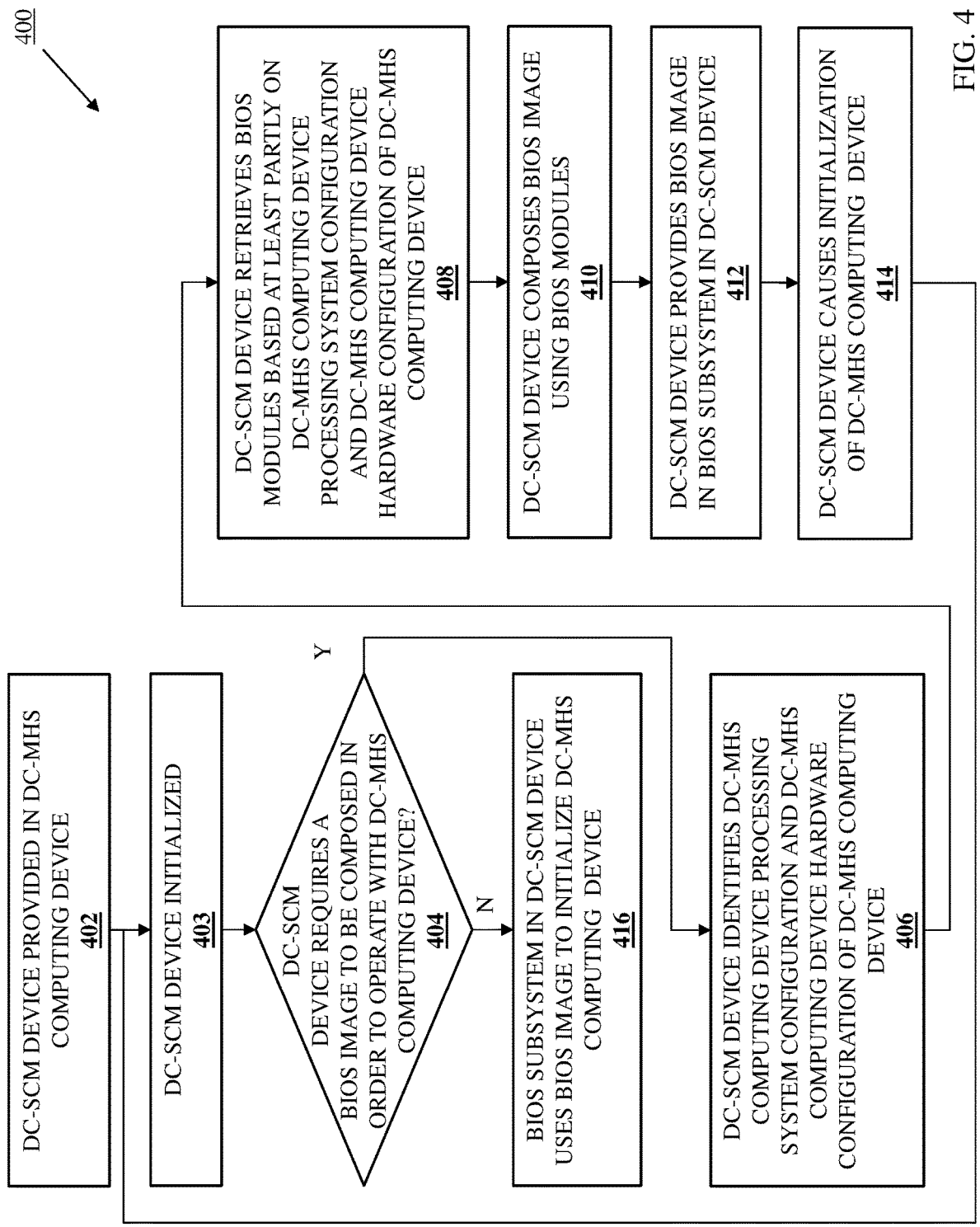
FIG. 4 is a flow chart illustrating an embodiment of a method for composing a BIOS for a DC-SCM.

Referring now to FIG. 4, an embodiment of a method 400 for composing a BIOS for a DC-SCM is illustrated. As discussed below, the systems and methods of the present disclosure provide for the composing of a BIOS based on a DC-MHS processing system configuration and DC-MHS hardware configuration of a DC-MHS computing device. For example, the DC-SCM composable BIOS system of the present disclosure may include a DC-MHS computing device having a DC-SCM device with a BIOS subsystem and a BIOS configuration database. During initialization operations for the DC-SCM device that are part of an initialization of the DC-MHS computing device, the DC-SCM device determines that the DC-SCM device requires a BIOS image to be composed in order to operate with the DC-MHS computing device, and identifies a DC-MHS computing device processing system configuration and a DC-MHS computing device hardware configuration of the DC-MHS computing device. The DC-SCM device then retrieves BIOS modules from the BIOS configuration database based at least partly on the DC-MHS computing device processing system configuration and the DC-MHS computing device hardware configuration of the DC-MHS computing device, and uses them to compose the BIOS image. The DC-SCM device then provides the BIOS image in the BIOS subsystem, and causes a second initialization of the DC-MHS computing device. As such, DC-SCM devices may be moved between DC-MHS computing devices and may compose the BIOS image used to provide the BIOS required to operate with those DC-MHS computing devices as needed.

Figure 5:
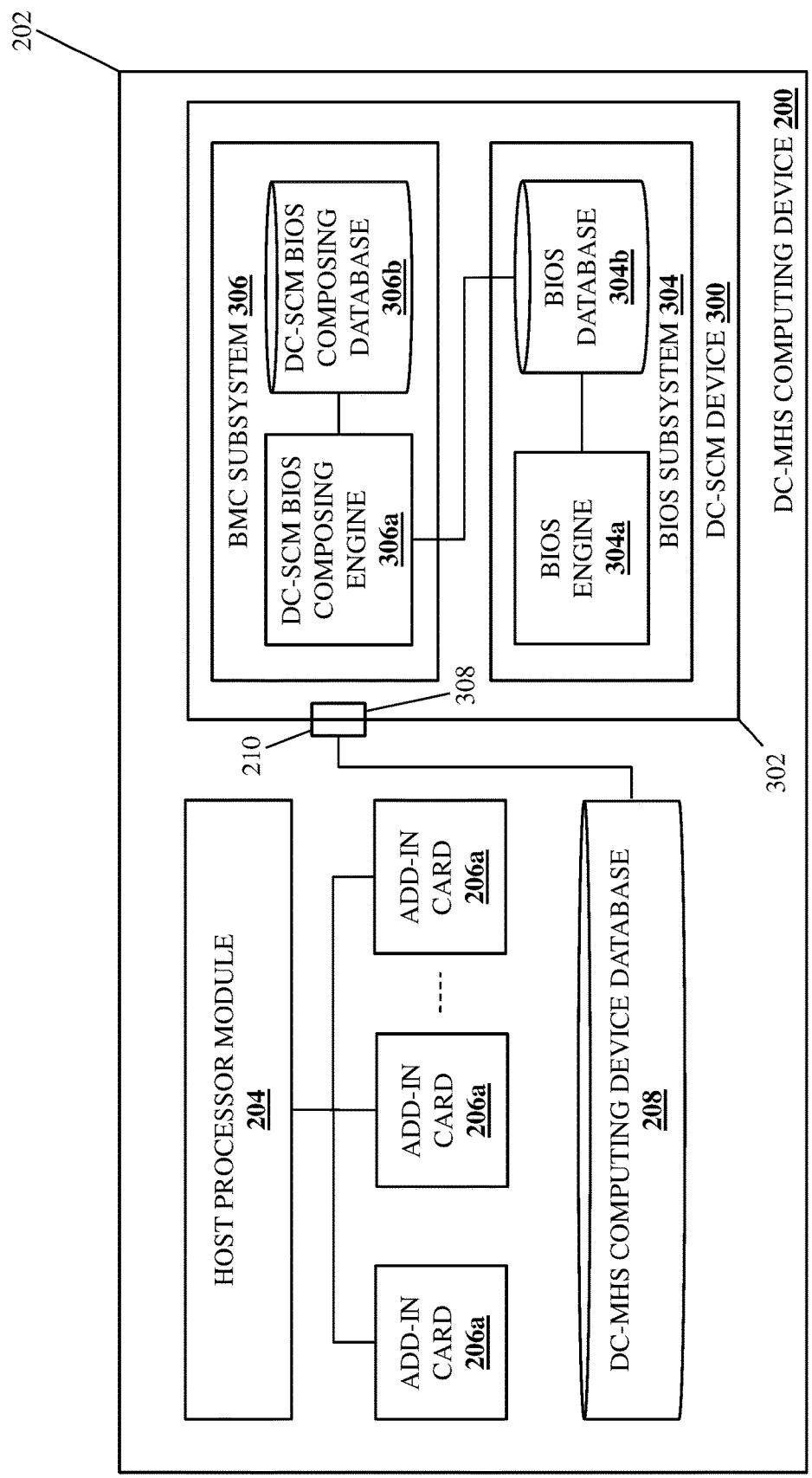
FIG. 5 is a schematic view illustrating an embodiment of the DC-SCM device of FIG. 3 provided in the DC-MHS computing device of FIG. 2 during the method of FIG. 4 to provide a DC-SCM composable BIOS system according to the teachings of the present disclosure.

The method 400 begins at block 402 where a DC-SCM device is provided in a DC-MHS computing device. With reference to FIG. 5, in an embodiment of block 402, the DC-SCM device 300 discussed above with reference to FIG. 3 may be provided in the DC-MHS computing device 200 discussed above with reference to FIG. 2 by, for example, connecting the DC-MHS computing device connector 308 on the DC-SCM device 300 to the DC-SCM device connector 210 on the DC-MHS computing device 200. In some of the specific examples described below, the DC-SCM device 300 may have previously been provided in and utilized with another DC-MHS computing device (e.g., a "previous DC-MHS computing device" which is similar to the "current" DC-MHS computing device 300 but with a different DC-SCM computing device processing system configuration and/or a different DC-SCM computing device hardware configuration) before being removed from that previous DC-MHS computing device and provided in the current DC-MHS computing device 300 as illustrated in FIG. 5, and thus the DC-SCM device 300 may have previously composed a BIOS image and used that BIOS image to provide a BIOS to operate with that previous DC-MHS computing device similarly as described below. However, one of skill in the art in possession of the present disclosure will appreciate how the DC-SCM device 300 may be a "new" DC-SCM device being provided in the DC-MHS computing device 200 and composing and using a BIOS image to provide a BIOS to operate with the DC-MHS computing device 200 for the first time (e.g., subsequent to its manufacture) while remaining within the scope of the present disclosure as well.

The method 400 then proceeds to block 403 where the DC-SCM device is initialized. In an embodiment, the DC-MHS computing device 200 may be powered on, reset, booted, rebooted, and/or otherwise have a DC-MHS computing device initialization process begun such that the DC-SCM device 300 receives power and begins a DC-SCM initialization process. As will be appreciated by one of skill in the art in possession of the present disclosure, in some examples, the BMC subsystem 306 in the DC-SCM device 300 may be configured to operate as a "Root of Trust" (ROT) for any DC-MHS computing device in which is provided, and thus the BMC subsystem 306 may be the first component in the DC-MHS computing device 200 to initialize following the beginning of the initialization process for the DC-MHS computing device 200, and following its initialization may operate to validate other component(s) in the DC-MHS computing device 200.

Figure 6:
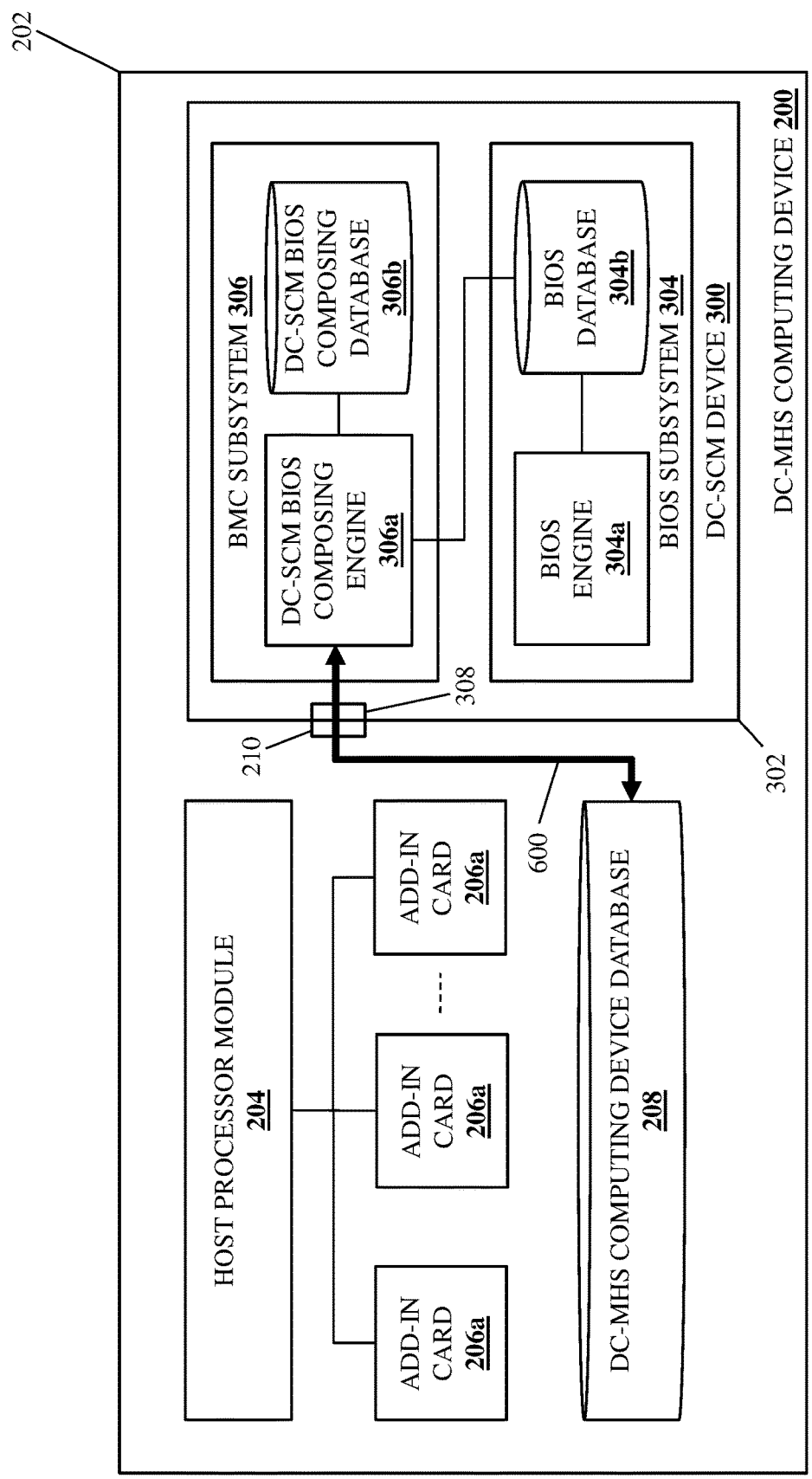
FIG. 6 is a schematic view illustrating an embodiment of the DC-SCM composable BIOS system of FIG. 5 operating during the method of FIG. 4.

The method 400 then proceeds to decision block 404 where the DC-SCM device determines whether the DC-SCM device requires a BIOS image to be composed in order to operate with the DC-MHS computing device. With reference to FIG. 6, in an embodiment of block 402 and during the DC-SCM initialization process, the DC-SCM BIOS composing engine 306a in the BMC subsystem 206 of the DC-SCM device 300 may perform DC-MHS computing device database access operations 600 that, in the illustrated example, include accessing DC-MHS computing device information (e.g., a "SystemCompositionImage") in the DC-MHS computing device database 208 and identifying the HPM 204 that is included in the DC-MHS computing device 200. In response to identifying the HPM 204, the DC-SCM BIOS composing engine 306a may determine whether that HPM 204 is different than a previous HPM in a previous DC-MHS computing device with which the DC-SCM device 300 was most recently utilized (e.g., a previous DC-MHS computing device with which the DC-SCM device 300 composed a BIOS image to provide a BIOS in order to operate with that previous DC-MHS computing device similarly as described below). For example, information about the previous HPM in the previous DC-MHS computing device with which the DC-SCM device 300 was most recently utilized may be stored in the DC-SCM BIOS composing database 306b in the BMC subsystem 306 of the DC-SCM device 300 (or other storage locations accessible to the DC-SCM BIOS composing engine 306a), and may be compared to the HPM 204 at block 404 using any of a variety of techniques that would be apparent to one of skill in the art in possession of the present disclosure.

As will be appreciated by one of skill in the art in possession of the present disclosure, if the HPM 204 is the same as the previous HPM in the previous DC-MHS computing device with which the DC-SCM device 300 was most recently utilized, then the BIOS database 304b in the BIOS subsystem 304 of the DC-SCM device 300 will already include a BIOS image for providing a BIOS to operate with the DC-MHS computing device 200 (e.g., with that BIOS image having previously been composed similarly as discussed below), and thus the method 400 may proceed to block 418, discussed in further detail below. As such, a DC-SCM device that has previously composed a BIOS image to provide a BIOS for use in operating with a DC-MHS computing device may subsequently provide a BIOS for operating with that DC-MHS computing device using that BIOS image until that DC-SCM device is moved to a different DC-MHS computing device.

However, if the HPM 204 is different than the previous HPM in the previous DC-MHS computing device with which the DC-SCM device 300 was most recently utilized, then the DC-SCM device 300 has been moved to the DC-MHS computing device 200 from a previous DC-MHS computing device, and thus may require a different BIOS in order to operate with the DC-MHS computing device 200. As such, the DC-SCM BIOS composing engine 306a may determine at decision block 404 that a BIOS image must be composed. Furthermore, one of skill in the art in possession of the present disclosure will appreciate how the DC-SCM BIOS composing engine 306a may determine when it has been provided in the DC-MHS computing device 300 for the first time such that a BIOS image must be composed in order to allow the DC-SCM device 300 to operate with the DC-MHS computing device 200 (e.g., in response to determining that there is no information about a previous HPM/previous DC-MHS computing device with which the DC-SCM device 300 was most recently utilized stored in the DC-SCM BIOS composing database 306b). However, while specific examples have been described, one of skill in the art in possession of the present disclosure will appreciate how the DC-SCM device 300 may determine that it requires a BIOS image to be composed in order to operate with a DC-MHS computing device in which it has been provided using a variety of techniques that will fall within the scope of the present disclosure as well.

If, as decision block 404, the DC-SCM device 300 determined that the DC-SCM device requires a BIOS image to be composed in order to operate with the DC-MHS computing device, the method 400 then proceeds to block 406 where the DC-SCM device identifies a DC-MHS computing device processing system configuration and a DC-MHS computing device hardware configuration of the DC-MHS computing device. With continued reference to FIG. 6, in an embodiment of block 406, the DC-MHS computing device database access operations 600 may include the DC-SCM BIOS composing engine 306a in the BMC subsystem 306 of the DC-SCM device 300 accessing the DC-MHS computing device information (e.g., the "SystemCompositionImage" discussed above) in the DC-MHS computing device database 208 of the DC-MHS computing device 200 to identify a DC-MHS computing device processing system configuration of the DC-MHS computing device 200. For example, as discussed above, the DC-MHS computing device processing system configuration of the DC-MHS computing device 200 may include a chipset configuration provided by the HPM 204 such as, for example, (details of a chipset configuration provided by the HPM 204 such as, for example, details for a chipset provided by INTEL® Corp. of Santa Clara, California, United States; details for a chipset provided by AMD® Corp. of Santa Clara, California, United States; and/or other chipset configuration information that would be apparent to one of skill in the art in possession of the present disclosure.

Furthermore, the DC-MHS computing device database access operations 600 may include the DC-SCM BIOS composing engine 306a in the BMC subsystem 306 of the DC-SCM device 300 accessing the DC-MHS computing device information (e.g., the "SystemCompositionImage" discussed above) in the DC-MHS computing device database 208 of the DC-MHS computing device 200 to identify a DC-MHS computing device hardware configuration of the DC-MHS computing device 200. For example, as discussed above, the DC-MHS computing device hardware configuration of the DC-MHS computing device 200 may include details about platform risers, backplanes, internal storage, and/or any other information about the DC-MHS computing device 200 that one of skill in the art in possession of the present disclosure would recognize as being required for a BIOS image that provides for the functionality described below. However, while a DC-MHS computing device processing system configuration and a DC-MHS computing device hardware configuration of the DC-MHS computing device 200 have been described, one of skill in the art in possession of the present disclosure will appreciate how any other BIOS-image-related details may be identified for the DC-MHS computing device 200 at block 406 while remaining within the scope of the present disclosure as well.

Figure 7:
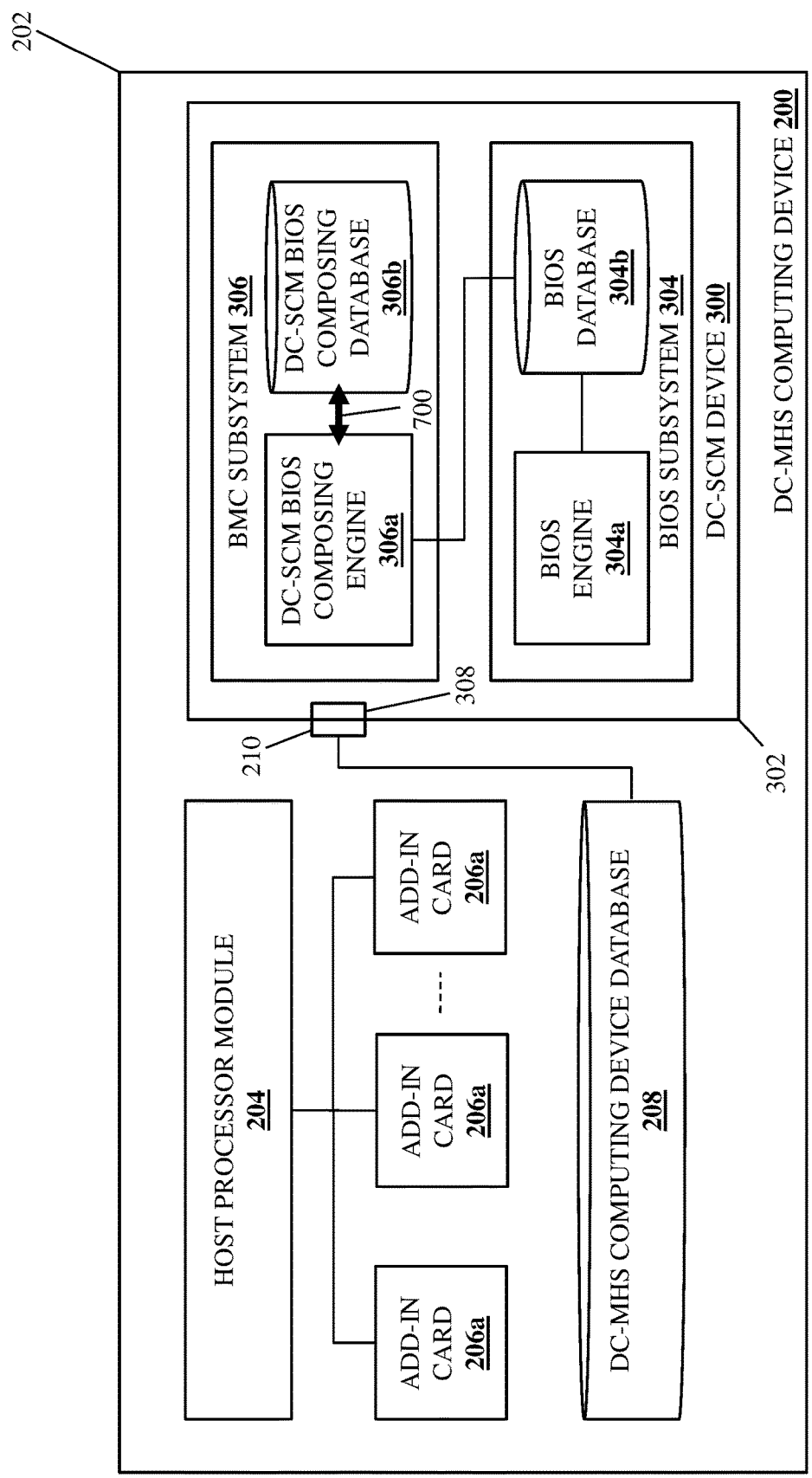
FIG. 7 is a schematic view illustrating an embodiment of the DC-SCM composable BIOS system of FIG. 5 operating during the method of FIG. 4.

The method 400 then proceeds to block 408 where the DC-SCM device retrieves BIOS modules based at least partly on the DC-MHS computing device processing system configuration and a DC-MHS computing device hardware configuration of the DC-MHS computing device. With reference to FIG. 7, in an embodiment of block 408, the DC-SCM BIOS composing engine 306a in the BMC subsystem 306 of the DC-SCM device 300 may perform BIOS module retrieval operations 700 that may include using the DC-MHS computing device processing system configuration of the DC-MHS computing device 200 that was identified at block 406 to identify and retrieve a logically composable DC-MHS computing device processing system BIOS module (e.g., via a mapping between the DC-MHS computing device processing system configuration and the DC-MHS computing device processing system BIOS module) that is configured to provide a BIOS image with BIOS functionality for that DC-MHS computing device processing system configuration (e.g., a DC-MHS computing device processing system BIOS module that is configured to provide a BIOS image with BIOS functionality for a chipset provided by INTEL® Corp. of Santa Clara, California, United States; a chipset provided by AMD® Corp. of Santa Clara, California, United States; or other chipsets that would be apparent to one of skill in the art in possession of the present disclosure).

Furthermore, the BIOS module retrieval operations 700 performed by the DC-SCM BIOS composing engine 306a in the BMC subsystem 306 of the DC-SCM device 300 may include using the DC-MHS computing device hardware configuration of the DC-MHS computing device 200 that was identified at block 406 to identify and retrieve a logically composable DC-MHS computing device hardware BIOS module (e.g., via a mapping between the DC-MHS computing device hardware configuration and the DC-MHS computing device hardware BIOS module) that is configured to provide a BIOS image with BIOS functionality for that DC-MHS computing device hardware configuration (e.g., a DC-MHS computing device hardware BIOS module that is configured to provide a BIOS image with BIOS functionality for the platform risers, backplanes, internal storage, and/or other hardware included in the DC-MHS computing device 200.

Further still, the BIOS module retrieval operations 700 performed by the DC-SCM BIOS composing engine 306a in the BMC subsystem 306 of the DC-SCM device 300 may include retrieving a logically composable core services BIOS module that is independent of the DC-MHS computing device processing system configuration and the DC-MHS computing device hardware configuration of the DC-MHS computing device 200, and that one of skill in the art in possession of the present disclosure will appreciate may be used to configure a BIOS image with any of a variety of BIOS core services that would be apparent to one of skill in the art in possession of the present disclosure and that may be independent of the DC-MHS computing device in which the DC-SCM device is provided. However, while the retrieval of a few specific BIOS modules has been described, one of skill in the art in possession of the present disclosure will appreciate how other BIOS modules may be retrieved at block 408 for use in providing a BIOS image that will allow the DC-SCM device 300 to operate with the DC-MHS computing device 200 (i.e., based any of a variety of DC-MHS computing device details) while remaining within the scope of the present disclosure as well.

The method 400 then proceeds to block 410 where the DC-SCM device composes a BIOS image using the BIOS modules. In an embodiment, at block 410, the DC-SCM BIOS composing engine 306a in the BMC subsystem 306 of the DC-SCM device 300 may perform BIOS image composing operations that may include using the DC-MHS computing device processing system BIOS module, the DC-MHS computing device hardware BIOS module, the core services BIOS module, and/or any other BIOS modules that would be apparent to one of skill in the art in possession of the present disclosure, in order to compose a BIOS image (e.g., a BIOS firmware image) that is configured to provide a BIOS with BIOS functionality that will allow the DC-SCM device 300 to operate with the DC-MHS computing device processing system configuration and DC-MHS computing device hardware configuration of the DC-MHS computing device 200, while also providing BIOS core services functionality and/or any other BIOS functionality known in the art. As such, the BIOS image composing operations may utilize any of a variety of BIOS image generation techniques that would be apparent to one of skill in the art in possession of the present disclosure.

Figure 8:
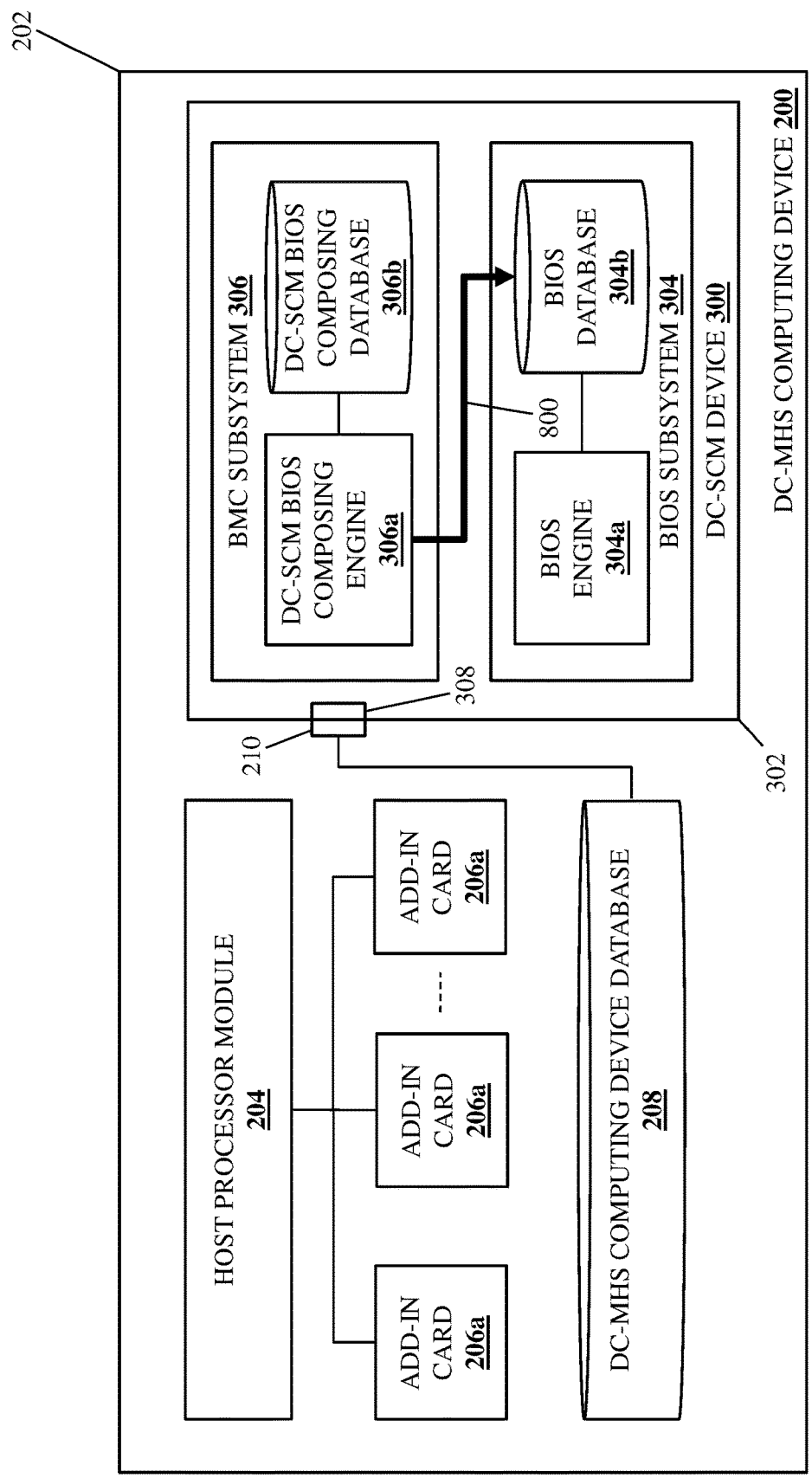
FIG. 8 is a schematic view illustrating an embodiment of the DC-SCM composable BIOS system of FIG. 5 operating during the method of FIG. 4.

The method 400 then proceeds to block 412 where the DC-SCM device provides the BIOS image in a BIOS subsystem in the DC-SCM device. With reference to FIG. 8, in an embodiment of block 412, the DC-SCM BIOS composing engine 306a in the BMC subsystem 306 of the DC-SCM device 300 may perform BIOS image provisioning operations 800 that may include providing the BIOS image that was composed at block 410 in the BIOS database 304b in the BIOS subsystem 304 of the DC-SCM device 300. As will be appreciated by one of skill in the art in possession of the present disclosure, in some embodiments, the DC-SCM BIOS composing engine 306a in the BMC subsystem 306 of the DC-SCM device 300 may generate and store a digital signature of the BIOS image (e.g., by generating a hash value for the BIOS image and storing it in a secure portion of the DC-SCM BIOS composing database 306b) prior to providing the BIOS image in the BIOS database 304b, which one of skill in the art in possession of the present disclosure will appreciate may allow the BMC subsystem 306 to verify that the BIOS image utilized from the BIOS database 304b during subsequent initializations of the DC-MHS computing device 200 has not been altered or corrupted in any manner (e.g., by generating a hash value of that BIOS image and comparing it to the hash value stored in the secure portion of the DC-SCM BIOS composing database 306b).

The method 400 then proceeds to block 414 where the DC-SCM device causes initialization of the DC-MHS computing device. In an embodiment, at block 414, the DC-SCM BIOS composing engine 306a in the BMC subsystem 306 of the DC-SCM device 300 may perform DC-MHS computing device initialization operations that may include resetting, rebooting, and/or otherwise initializing the DC-MHS computing device 200 (i.e., a "second" initialization of the DC-MHS computing device 200 following the beginning of the "first" initialization of the DC-MHS computing device 200 and the corresponding initialization of the DC-SCM device at block 404 that resulting in the composing of the BIOS image as described above).

Following block 414, the method 400 returns to block 403 where the DC-SCM device is initialized similarly as described above, which as described above may include the BMC subsystem 306 in the DC-SCM device 300 verifying the BIOS image that was previously stored in the BIOS database 304b in the BIOS subsystem 304 of the DC-SCM device 300. The method 400 then proceeds to decision block 404, and one of skill in the art in possession of the present disclosure will appreciate how the DC-SCM device 300 will determine that it does not require a BIOS image to be composed in order to operate with the DC-MHS computing device 200 during this performance of decision block 404 (i.e., because the previous performance of the method 400 described in detail above composed such a BIOS image).

Figure 9:
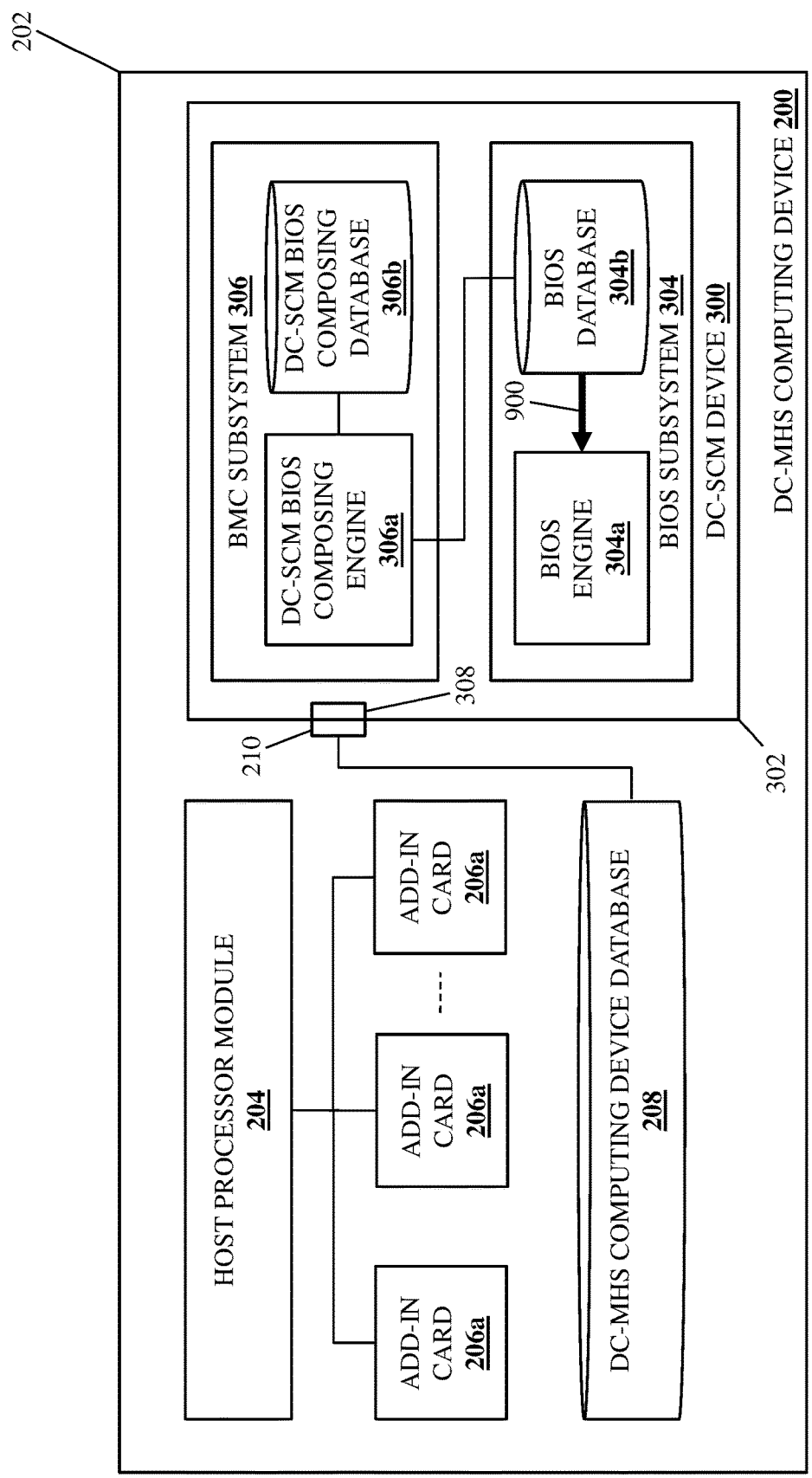
FIG. 9 is a schematic view illustrating an embodiment of the DC-SCM composable BIOS system of FIG. 5 operating during the method of FIG. 4.

As such, the method 400 may then proceed to block 416 where a BIOS subsystem in the DC-SCM device uses the BIOS image to initialize the DC-MHS computing device. With reference to FIG. 9, in an embodiment of block 416, the BIOS engine 304a in the BIOS subsystem 304 of the DC-SCM device 300 may perform BIOS image access operations 900 that include accessing the BIOS image from the BIOS database 304b in the BIOS subsystem 304 of the DC-SCM device 300, and using that BIOS image to provide a BIOS that operates to initialize the DC-MHS computing device 200.

Thus, systems and methods have been described that provide for the composing of a BIOS based on a DC-MHS processing system configuration and DC-MHS hardware configuration of a DC-MHS computing device. For example, the DC-SCM composable BIOS system of the present disclosure may include a DC-MHS computing device having a DC-SCM device with a BIOS subsystem and a BIOS configuration database. During initialization operations for the DC-SCM device that are part of an initialization of the DC-MHS computing device, the DC-SCM device determines that the DC-SCM device requires a BIOS image to be composed in order to operate with the DC-MHS computing device, and identifies a DC-MHS computing device processing system configuration and a DC-MHS computing device hardware configuration of the DC-MHS computing device. The DC-SCM device then retrieves BIOS modules from the BIOS configuration database based at least partly on the DC-MHS computing device processing system configuration and the DC-MHS computing device hardware configuration of the DC-MHS computing device, and uses them to compose the BIOS image. The DC-SCM device then provides the BIOS image in the BIOS subsystem, and causes a second initialization of the DC-MHS computing device. As such, DC-SCM devices may be moved between DC-MHS computing devices and may compose the BIOS image used to provide the BIOS required to operate with those DC-MHS computing devices as needed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A DataCenter Secure Control Module (DC-SCM) composable Basic Input/Output System (BIOS) system, comprising:
   a DataCenter Modular Hardware System (DC-MHS) computing device; and
   a DataCenter Secure Control Module (DC-SCM) device in the DC-MHS computing device that includes:
   a Basic Input/Output System (BIOS) subsystem; and
   a DC-SCM BIOS composing subsystem that includes a BIOS configuration database and that is configured to:
   determine, during initialization operations for the DC-SCM device that are part of a first initialization of the DC-MHS computing device, that the DC-SCM device requires a BIOS image to be composed in order to operate with the DC-MHS computing device;

identify a DC-MHS computing device processing system configuration and a DC-MHS computing device hardware configuration of the DC-MHS computing device;

retrieve, from the BIOS configuration database based at least partly on the DC-MHS computing device processing system configuration and the hardware configuration of the DC-MHS computing device, a plurality of BIOS modules;

compose, using the plurality of BIOS modules, the BIOS image;

provide the BIOS image in the BIOS subsystem; and cause a second initialization of the DC-MHS computing device.

2. The system of claim 1, wherein the DC-SCM BIOS composing subsystem is a Baseboard Management Controller (BMC) subsystem is configured to determine that the DC-SCM device requires the BIOS image to be composed in order to operate with the DC-MHS computing device, identify the DC-MHS computing device processing system configuration and the DC-MHS computing device hardware configuration of the DC-MHS computing device, retrieve the plurality of BIOS modules, compose the BIOS image, provide the BIOS image in the BIOS subsystem, and cause a second initialization of the DC-MHS computing device.

3. The system of claim 1, wherein the determining that the DC-SCM device requires the BIOS image to be composed in order to operate with the DC-MHS computing device includes:

determining that a current Host Processor Module (HPM) in the DC-MHS computing device is different than a previous HPM with which the DC-SCM device was most recently utilized.

4. The system of claim 1, wherein the at least one BIOS module includes a DC-MHS computing device processing system BIOS module that is configured to enable BIOS functionality for the DC-MHS computing device processing system configuration of the DC-MHS computing device, and a DC-MHS computing device hardware configuration BIOS module that is configured to enable BIOS functionality for the DC-MHS computing device hardware configuration of the DC-MHS computing device.

5. The system of claim 4, wherein the at least one BIOS module includes a core services BIOS module that is independent of the DC-MHS computing device processing system configuration and the DC-MHS computing device hardware configuration of the DC-MHS computing device.

6. The system of claim 1, wherein the DC-SCM device is configured to:

store a signature of the BIOS image prior to providing the BIOS image in the BIOS subsystem; and verify the BIOS image as part of the second initialization of the DC-MHS computing device and based on the signature of the BIOS image.

7. The system of claim 1, wherein the BIOS subsystem in DC-SCM device is configured to:

initialize, during the second initialization of the DC-MHS computing device, the DC-MHS computing device using the BIOS image.

8. A DataCenter Secure Control Module (DC-SCM) device, comprising:

a DataCenter Secure Control Module (DC-SCM) chassis;

a DC-SCM Basic Input Output System (BIOS) composing subsystem that is supported by the DC-SCM chassis and that includes:

a DC-SCM BIOS composing storage system that includes a BIOS configuration database;

a DC-SCM BIOS composing processing system that is coupled to the DC-SCM BIOS composing storage system; and a DC-SCM BIOS composing memory system that is coupled to the DC-SCM BIOS composing processing system and that includes instructions that, when executed by the DC-SCM BIOS composing processing system, cause the DC-SCM BIOS composing processing system to provide a DC-SCM Systems-BIOS) composing engine that is configured to:

determine, during initialization operations for the DC-SCM device that are part of a first initialization of a DataCenter Modular Hardware System (DC-MHS) computing device in which the DC-SCM device is located, that the DC-SCM device requires a BIOS image to be composed in order to operate with the DC-MHS computing device;

identify a DC-MHS computing device processing system configuration and a DC-MHS computing device hardware configuration of the DC-MHS computing device;

retrieve, from the BIOS configuration database based at least partly on the DC-MHS computing device processing system configuration and the DC-MHS computing device hardware configuration of the DC-MHS computing device, a plurality of BIOS modules;

compose, using the plurality of BIOS modules, the BIOS image;

provide the BIOS image in a BIOS subsystem that is coupled-supported by the DC-SCM chassis; and cause a second initialization of the DC-MHS computing device.

9. The DC-SCM device of claim 8, wherein the DC-SCM BIOS) composing subsystem is a Baseboard Management Controller (BMC) subsystem.

10. The DC-SCM device of claim 8, wherein the determining that the DC-SCM device requires the BIOS image to be composed in order to operate with the DC-MHS computing device includes:

determining that a current Host Processor Module (HPM) in the DC-MHS computing device is different than a previous HPM with which the DC-SCM device was most recently utilized.

11. The DC-SCM device of claim 8, wherein the at least one BIOS module includes a DC-MHS computing device processing system BIOS module that is configured to enable BIOS functionality for the DC-MHS computing device processing system configuration of the DC-MHS computing device, and a DC-MHS computing device hardware configuration BIOS module that is configured to enable BIOS functionality for the DC-MHS computing device hardware configuration of the DC-MHS computing device.

12. The DC-SCM device of claim 11, wherein the at least one BIOS module includes a core services BIOS module that is independent of the of the DC-MHS computing device processing system configuration and the DC-MHS computing device hardware configuration of the DC-MHS computing device.

13. The DC-SCM device of claim 8, wherein the DC-SCM BIOS composing engine is configured to:

store a signature of the BIOS image prior to providing the BIOS image in the BIOS subsystem; and verify the BIOS image as part of the second initialization of the DC-MHS computing device and based on the signature of the BIOS image.

14. A method for composing a Basic Input/Output System (BIOS) for a DataCenter Secure Control Module (DC-SCM), comprising:
- determining, by a DataCenter Secure Control Module (DC-SCM) BIOS composing subsystem in a DC-SCM device during initialization operations for the DC-SCM device that are part of a first initialization of a DataCenter Modular Hardware System (DC-MHS) computing device in which the DC-SCM device is located, that the DC-SCM device requires a Basic Input/Output System (BIOS) image to be composed in order to operate with the DC-MHS computing device;
- identifying, by the DC-SCM BIOS composing subsystem, a DC-MHS computing device processing system configuration and a DC-MHS computing device hardware configuration of the DC-MHS computing device;
- retrieving, by the DC-SCM BIOS composing subsystem from a BIOS configuration database in the DC-SCM BIOS composing subsystem and based at least partly on the DC-MHS computing device processing system configuration and the DC-MHS computing device hardware configuration of the DC-MHS computing device, a plurality of BIOS modules;
- composing, by the DC-SCM BIOS composing subsystem using the plurality of BIOS modules, the BIOS image;
- providing, by the DC-SCM BIOS composing subsystem, the BIOS image in a BIOS subsystem in the DC-SCM device; and
- causing, by the DC-SCM BIOS composing subsystem, a second initialization of the DC-MHS computing device.

15. The method of claim 14, wherein the DC-SCM BIOS composing subsystem is a Baseboard Management Controller (BMC) subsystem that determines that the DC-SCM device requires the BIOS image to be composed in order to operate with the DC-MHS computing device, identifies the DC-MHS computing device processing system configuration and the DC-MHS computing device hardware configuration of the DC-MHS computing device, retrieves the plurality of BIOS modules, composes the BIOS image, provides the BIOS image in the BIOS subsystem, and causes a second initialization of the DC-MHS computing device.

16. The method of claim 14, wherein the determining that the DC-SCM device requires the BIOS image to be composed in order to operate with the DC-MHS computing device includes:
- determining that a current Host Processor Module (HPM) in the DC-MHS computing device is different than a previous HPM with which the DC-SCM device was most recently utilized.

17. The method of claim 14, wherein the at least one BIOS module includes a DC-MHS computing device processing system BIOS module that is configured to enable BIOS functionality for the DC-MHS computing device processing system configuration of the DC-MHS computing device, and a DC-MHS computing device hardware configuration BIOS module that is configured to enable BIOS functionality for the DC-MHS computing device hardware configuration of the DC-MHS computing device.

18. The method of claim 17, wherein the at least one BIOS module includes a core services BIOS module that is independent of the of the DC-MHS computing device processing system configuration and the DC-MHS computing device hardware configuration of the DC-MHS computing device.

19. The method of claim 14, further comprising:
- storing, by the DC-SCM device, as signature of the BIOS image prior to providing the BIOS image in the BIOS subsystem; and
- verifying, by the DC-SCM device, the BIOS image as part of the second initialization of the DC-MHS computing device and based on the signature of the BIOS image.

20. The method of claim 14, further comprising:
- initializing, by a BIOS subsystem in the DC-SCM device during the second initialization of the DC-MHS computing device, the DC-MHS computing device using the BIOS image.

* * * * *